United States Patent
Fu et al.

(10) Patent No.: US 9,252,663 B2
(45) Date of Patent: Feb. 2, 2016

(54) METHOD AND SYSTEM FOR CONVERTING A DC VOLTAGE

(71) Applicant: Texas Instruments Incorporated, Dallas, TX (US)

(72) Inventors: Wei Fu, Dallas, TX (US); Karan Singh Bhatia, Plano, TX (US); Siang Tong Tan, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 300 days.

(21) Appl. No.: 14/039,661

(22) Filed: Sep. 27, 2013

(65) Prior Publication Data
US 2015/0091538 A1    Apr. 2, 2015

(51) Int. Cl.
*H02M 3/158* (2006.01)
*H02M 3/156* (2006.01)
*G05F 1/575* (2006.01)
*H02M 1/00* (2007.01)

(52) U.S. Cl.
CPC .............. *H02M 3/1563* (2013.01); *G05F 1/575* (2013.01); *H02M 3/158* (2013.01); *H02M 2001/0032* (2013.01)

(58) Field of Classification Search
CPC .............. G05F 1/10; G05F 1/56; G05F 1/575; H03K 5/2481; H03K 5/153; H02M 2001/0025; H02M 2001/0016; H02M 3/1588; H02M 2001/0032; H02M 3/1563; H02M 3/156; H02M 3/158
USPC ........... 323/282–285, 288; 327/236, 244, 205
See application file for complete search history.

(56) References Cited

U.S. PATENT DOCUMENTS

| | | | | |
|---|---|---|---|---|
| 6,181,169 B1* | 1/2001 | Hu | ........................ | H03K 5/2481 327/53 |
| 6,288,666 B1* | 9/2001 | Afghahi | ................. | H03K 5/249 327/52 |
| 8,212,538 B2* | 7/2012 | Nishida | ............... | H02M 3/1563 323/271 |
| 2004/0120169 A1* | 6/2004 | Schrom | ................. | H02M 3/156 363/65 |
| 2009/0009148 A1* | 1/2009 | Philbrick | .............. | H02M 3/156 232/282 |
| 2010/0320986 A1* | 12/2010 | Collins | ................. | H02M 3/156 323/284 |
| 2011/0156686 A1* | 6/2011 | Gakhar | .................... | G05F 1/575 323/284 |
| 2011/0221415 A1* | 9/2011 | Otsuk | ................. | H02M 3/1588 323/283 |
| 2011/0241738 A1* | 10/2011 | Tamaoka | ................ | H02M 1/08 327/109 |
| 2013/0106385 A1* | 5/2013 | Smith, Jr. | ............ | H02M 3/1588 323/288 |

(Continued)

*Primary Examiner* — Timothy J Dole
*Assistant Examiner* — Shahzeb K Ahmad
(74) *Attorney, Agent, or Firm* — Michael A. Davis, Jr.; Frank D. Cimino

(57) ABSTRACT

An output voltage is compared to a reference voltage, comparison signals are generated, and control signals and mode signals are generated in response thereto. The output voltage is generated in response to the control signals. A speed of the comparing is increased in response to the mode signals indicating that the output voltage is being increased. The speed is reduced in response to the mode signals indicating that the output voltage is being reduced. For increasing the speed, a path is enabled to conduct current. While the path is enabled, at least one switched voltage is connected to vary an amount of the current conducted through the path. The switched voltage is at least one of the reference voltage and the output voltage. For reducing the speed, the path is disabled against conducting current. While the path is disabled, the switched voltage is disconnected from varying the amount.

21 Claims, 1 Drawing Sheet

(56) References Cited

U.S. PATENT DOCUMENTS

| | | | |
|---|---|---|---|
| 2014/0028353 A1* | 1/2014 | Fan | H03K 5/153 327/77 |
| 2014/0043562 A1* | 2/2014 | Kikuchi | G01R 19/10 349/61 |
| 2014/0091776 A1* | 4/2014 | Matsuda | G05F 1/56 323/282 |
| 2014/0176105 A1* | 6/2014 | Yamaguchi | H02M 1/08 323/284 |
| 2014/0253060 A1* | 9/2014 | Lin | G05F 1/10 323/271 |

* cited by examiner

METHOD AND SYSTEM FOR CONVERTING A DC VOLTAGE

BACKGROUND

The disclosures herein relate in general to electronic circuitry, and in particular to a method and system for converting a direct current ("DC") voltage.

A conventional voltage mode hysteretic DC/DC buck converter may support a relatively wide range of variability (e.g., capacitance and inductance) in off-chip components, without compromising output voltage ripple. However, while operating in discontinuous conduction mode ("DCM") under light load conditions (e.g., less than 1 mA), such converter's quiescent current ("IQQ") loss could unacceptably degrade efficiency (e.g., in a voltage-hysteretic comparator of a DC/DC control loop), especially if such IQQ loss is significant relative to such converter's switching and conduction losses under light load conditions. Moreover, such converter might consume an unacceptably high amount of power.

By comparison, under light load conditions: (a) a constant on time ("COT") DC/DC converter may have acceptably small IQQ loss, but such converter supports a relatively narrow range of variability in off-chip components; and (b) a current mode hysteretic DC/DC converter may have acceptably small IQQ loss, but such converter might rely on an unacceptably large inductor (e.g., 10 µH+) for accurate current sensing.

SUMMARY

An output voltage is compared to a reference voltage, comparison signals are generated, and control signals and mode signals are generated in response thereto. The output voltage is generated in response to the control signals. A speed of the comparing is increased in response to the mode signals indicating that the output voltage is being increased. The speed is reduced in response to the mode signals indicating that the output voltage is being reduced. For increasing the speed, a path is enabled to conduct current. While the path is enabled, at least one switched voltage is connected to vary an amount of the current conducted through the path. The switched voltage is at least one of the reference voltage and the output voltage. For reducing the speed, the path is disabled against conducting current. While the path is disabled, the switched voltage is disconnected from varying the amount.

DETAILED DESCRIPTION

Figure 1:
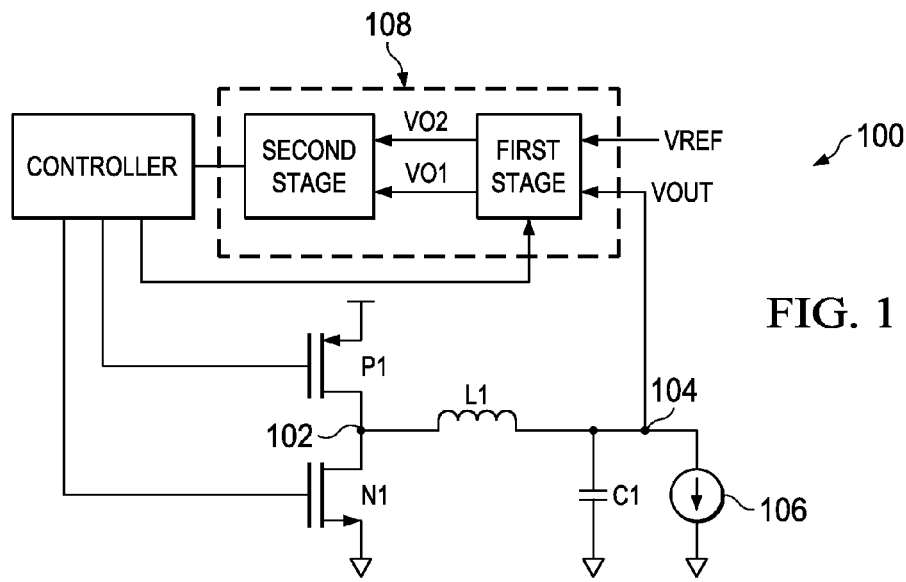
FIG. 1 is a schematic electrical circuit diagram of a system of the illustrative embodiments.

FIG. 1 is a schematic electrical circuit diagram of a system, indicated generally at 100, of the illustrative embodiments. In one version of the illustrative embodiments, the system 100 is formed as an integrated circuit. As shown in FIG. 1, a controller has: (a) a first output, which is connected to a gate of a p-channel field-effect transistor ("PFET"), namely P1; (b) a second output, which is connected to a gate of an n-channel field-effect transistor ("NFET"), namely N1; and (c) a third output for outputting mode signals, which are discussed hereinbelow in connection with FIGS. 2 and 3.

A node 102 is connected to respective drains of P1 and N1. A source of P1 is connected to a positive voltage source (e.g., ~3 volts). A source of N1 is connected to a ground.

The node 102 is coupled through an inductor L1 to a node 104. The node 104 is coupled through a capacitor C1 to the ground. Also, the node 104 is coupled through a variable load 106 (e.g., current source) to the ground.

A comparator, indicated by dashed enclosure 108, has: (a) a first input, which is connected to the node 104; and (b) a second input, which receives a reference voltage VREF (e.g., ~1.2 volts). The comparator 108: (a) compares an output voltage of the node 104 ("VOUT") to VREF; and (b) in response thereto, generates and outputs comparison signals to the controller.

In this example, the comparator 108 includes a first stage for: (a) receiving and amplifying VOUT and VREF; (b) in response thereto, outputting amplified voltages VO1 and VO2; and (c) from the controller, receiving the mode signals, which are discussed hereinbelow in connection with FIGS. 2 and 3. Further, the comparator 108 includes a second stage for: (a) receiving VO1 and VO2; and (b) in response thereto, outputting (to the controller) the comparison signals, which indicate whether VO1>VO2 or VO1<VO2.

The system 100 operates as a voltage mode hysteretic DC/DC buck converter. In response to the comparison signals from the comparator 108, the controller generates and outputs control signals to the respective gates of P1 and N1 for suitably turning P1 and N1 on and off, so that the system 100 circuitry generates VOUT≈VREF. For example, while the controller turns P1 on and N1 off, L1 charges through P1 to increase VOUT. By comparison, while the controller turns N1 on and P1 off, L1 discharges through N1. Accordingly, the controller ensures that: (a) if P1 is turned on, then N1 is turned off; and (b) conversely, if N1 is turned on, then P1 is turned off. While the system 100 operates in an idle state, the controller turns P1 off and N1 off, so that VOUT adjusts in response to other factors (e.g., the load 106 current and C1 decay).

Figure 2:
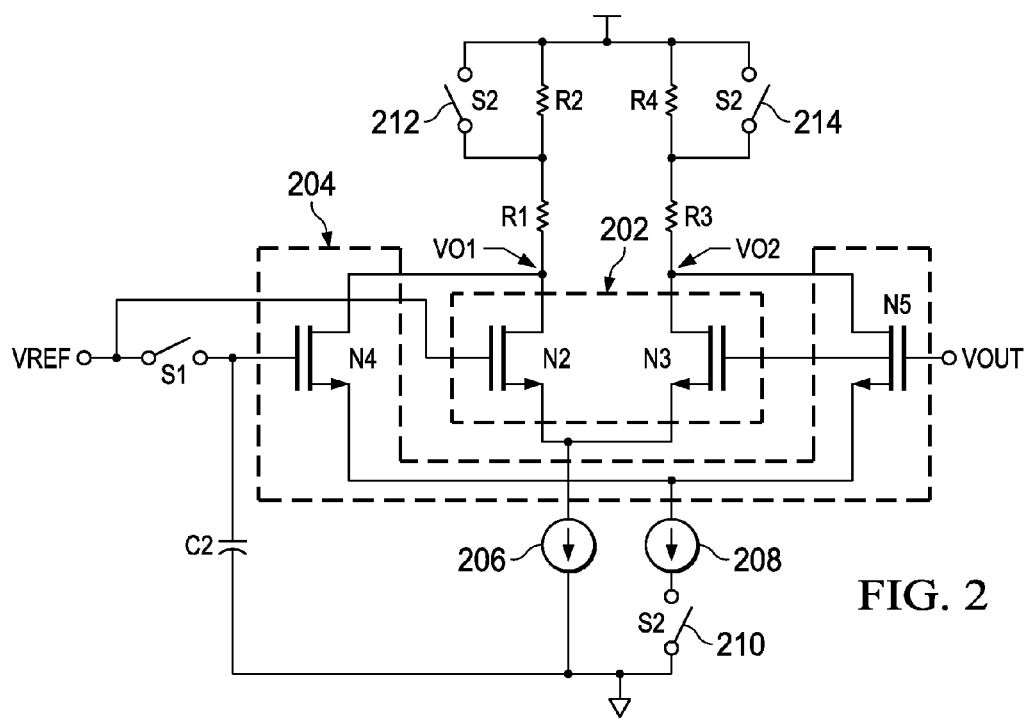
FIG. 2 is a block diagram of a first stage of a comparator of FIG. 1.

FIG. 2 is a block diagram of the first stage of the comparator 108. As shown in FIG. 2, the first stage includes: (a) a first pair of NFETs N2 and N3 ("fixed pair"), indicated by dashed enclosure 202, whose respective channel widths are substantially equal to one another; and (b) a second pair of NFETs N4 and N5 ("switched pair"), indicated by dashed enclosure 204, whose respective channel widths are substantially equal to one another.

Also, the first stage includes: (a) a switch S1; and (b) first, second and third switches S2. The switches S2 open and close together with one another. The first stage opens and closes the switches S1 and S2 in response to the mode signals from the controller. In one embodiment, the mode signals are identical to the control signals.

Figure 3:
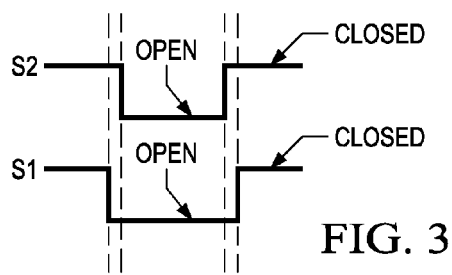
FIG. 3 is a timing diagram of the first stage of FIG. 2.

FIG. 3 is a timing diagram of the first stage of FIG. 2. While the switches S1 and S2 are closed, the first stage operates in a high speed mode to compare VOUT to VREF more quickly. Conversely, while the switches S1 and S2 are open, the first stage operates in a low speed mode to compare VOUT to VREF less quickly, which consumes substantially less power than the high speed mode.

Referring again to FIG. 2, VREF is connected to a gate of N2. A drain of N2 is coupled to the positive voltage source through a series of resistors R1 and R2. VOUT is connected to a gate of N3. A drain of N3 is coupled to the positive voltage source through a series of resistors R3 and R4. Respective sources of N2 and N3 are coupled through a current source 206 to the ground.

While the switch S1 is closed, VREF is connected to a gate of N4. Conversely, while the switch S1 is open, VREF is disconnected from the gate of N4. Also, the gate of N4 is coupled through a capacitor C2 to the ground. A drain of N4 is connected to the drain of N2, and such drains' voltage is VO1.

Also, VOUT is connected to a gate of N5. A drain of N5 is connected to the drain of N3, and such drains' voltage is VO2. Respective sources of N4 and N5 are coupled through a current source 208 to a first switch 210 of the switches S2.

In operation, as VOUT increases, more current flows through R3 (and likewise through R4 in the low speed mode), so that VO2 decreases toward the ground's voltage. Conversely, as VOUT decreases, less current flows through R3 (and likewise through R4 in the low speed mode), so that VO2 increases away from the ground's voltage. Similarly, if VREF increases, more current flows through R1 (and likewise through R2 in the low speed mode), so that VO1 decreases toward the ground's voltage. Conversely, if VREF decreases, less current flows through R1 (and likewise through R2 in the low speed mode), so that VO1 increases away from the ground's voltage.

While the first switch 210 is open (or "switched off") in the low speed mode, it disconnects the source 208 from the ground. Conversely, while the first switch 210 is closed (or "switched on") in the high speed mode, it connects the source 208 to the ground. In that manner, the first switch 210: (a) in the low speed mode, is opened to reduce the comparator 108 speed of comparing VOUT and VREF by disabling a path (e.g., N4, N5, the source 208, and the first switch 210) against conducting current; and (b) in the high speed mode, is closed to increase the comparator 108 speed of comparing VOUT and VREF by enabling such path to conduct current.

In the high speed mode, an amount of the current (conducted through such path) varies in response to VREF (while the switch S1 is closed) and in response to VOUT. According to the timing diagram of FIG. 3: (a) shortly after such path is enabled by closing the first switch 210, the switch S1 is closed for connecting VREF to vary an amount of the current conducted through the path; and (b) shortly before such path is disabled by opening the first switch 210, the switch S1 is opened for disconnecting VREF from varying such amount. In that manner, a transitioning (from closed to open, or vice versa) of the switch S1 is non-overlapping with a transitioning of the switches S2.

For example, while the switch S1 is open: (a) in response to opening the switches S2, voltage at the gate of N4 ("Vg") rises in response to a voltage at the source of N4 ("Vs") rising; and (b) similarly, in response to closing the switches S2, Vg falls in response to Vs falling. In that manner, during the transitioning of the switch S1, the first stage substantially reduces kickback noise injection into VREF (e.g., when transitioning from the high speed mode to the low speed mode, or vice versa), so that VO1's accuracy is preserved. Also, such reduction may be helpful if VREF is connected to (e.g., shared with) other circuitry.

While the switches S2 are closed, current through the source 208 is a factor N (e.g., N=10) times greater than current through the source 206. To handle such current through the source 208 for operation in the high speed mode: (a) N4's channel width is N times wider than N2's channel width; and (b) N5's channel width is N times wider than N3's channel width. Moreover, R2's resistance is N times greater than R1's resistance, and R4's resistance is N times greater than R3's resistance.

Accordingly, while the switches S2 are closed: (a) R1 is coupled to the positive voltage source through a second switch 212 of the switches S2, so that R2 is effectively bypassed; and (b) R3 is coupled to the positive voltage source through a third switch 214 of the switches S2, so that R4 is effectively bypassed. Such bypass helps to preserve accuracy of VO1, because: (a) the high speed mode's aggregate current through N2 and N4 (in parallel with one another) is N+1 times greater than the low speed mode's current through N2 (by itself); and (b) such increased current flows through R1 (whose resistance is only 1/(N+1) times the R1+R2 series resistance), instead of flowing through R2 in series with R1. Likewise, such bypass helps to preserve accuracy of VO2, because: (a) the high speed mode's aggregate current through N3 and N5 (in parallel with one another) is N+1 times greater than the low speed mode's current through N3 (by itself); and (b) such increased current flows through R3 (whose resistance is only 1/(N+1) times the R3+R4 series resistance), instead of flowing through R4 in series with R3.

The capacitor C2 helps to prevent a sudden large change: (a) in Vg (of N4) while the switch S1 is open; and (b) also, in voltage at the gate of N2 while the switch S1 is closed. Similarly, the capacitor C1 (FIG. 1) helps to prevent a sudden large change in voltage at the respective gates of N3 and N5.

Referring also to FIG. 1, C1's speed of charging (and likewise VOUT's speed of increasing) is faster than C1's speed of discharging (and likewise VOUT's speed of reducing). Accordingly, while the controller turns P1 on and N1 off, the controller generates and outputs the mode signals (indicating that L1 is charging through P1 to increase VOUT) for causing the first stage to close the switches S1 and S2 in the high speed mode. Conversely, while the controller turns N1 on and P1 off, the controller outputs the mode signals (indicating that L1 is discharging through N1) for causing the first stage to open the switches S1 and S2 in the low speed mode. Likewise, while the controller turns P1 off and N1 off (so that the system 100 operates in the idle state), the controller outputs the mode signals for causing the first stage to open the switches S1 and S2 in the low speed mode. In that manner, the comparator 108 operates with adjustable speed and power, in response to whether L1 is charging to increase VOUT (high speed mode), discharging (low speed mode), or neither (idle state).

In this example, a large fraction (~95% or more, especially if the load 106 is relatively small) of the first stage's operation happens in the low speed mode. By comparison, a small fraction (~5% or less, especially if the load 106 is relatively small) of the first stage's operation happens in the high speed mode. The first stage's transconductance ("gm") increases only during its relatively brief periods of operation in the high speed mode.

Accordingly, the system 100 operates as a voltage mode hysteretic DC/DC buck converter, while: (a) supporting a relatively wide range of variability (e.g., capacitance and inductance) in off-chip components, without compromising output voltage ripple; (b) having acceptably small IQQ loss, even while operating in DCM under light load conditions; and (c) consuming an acceptably low amount of power.

In a first alternative embodiment: (a) while the switch S1 is closed, VOUT is connected to the gate of N5, in addition to VREF being connected to the gate of N4; and (b) conversely, while the switch S1 is open, VOUT is disconnected from the gate of N5, in addition to VREF being disconnected from the gate of N4. In a second alternative embodiment: (a) while the switch S1 is closed, VOUT is connected to the gate of N5; (b) conversely, while the switch S1 is open, VOUT is disconnected from the gate of N5; and (c) VREF is always connected to the gate of N4. In a third alternative embodiment: (a) while a different switch (e.g., timed in relation to S1 and/or S2) is closed, VOUT is connected to the gate of N5; and (b) conversely, while the different switch is open, VOUT is disconnected from the gate of N5.

Although illustrative embodiments have been shown and described by way of example, a wide range of alternative embodiments is possible within the scope of the foregoing disclosure.

What is claimed is:

1. A method performed by a voltage converter, the method comprising:
   comparing an output voltage to a reference voltage and generating comparison signals in response to the comparing;
   generating control signals and mode signals in response to the comparison signals; and
   generating the output voltage in response to the control signals;
   wherein the comparing includes: increasing a speed of the comparing in response to the mode signals indicating that the output voltage is being increased; and reducing the speed in response to the mode signals indicating that the output voltage is being reduced;
   wherein increasing the speed includes: enabling a path to conduct current; and, while the path is enabled, connecting at least one switched voltage to vary an amount of the current conducted through the path, wherein the switched voltage is at least one of the reference voltage and the output voltage; and
   wherein reducing the speed includes: disabling the path against conducting current; and, while the path is disabled, disconnecting the switched voltage from varying the amount.

2. The method of claim 1, wherein generating the control signals includes: generating the control signals for causing the output voltage to approximately equal the reference voltage.

3. The method of claim 1, and comprising:
   bypassing a resistor while the path is enabled.

4. The method of claim 1, wherein a transitioning of the enabling and disabling is non-overlapping with a transitioning of the connecting and disconnecting.

5. The method of claim 4, wherein:
   connecting the switched voltage includes: after enabling the path, connecting the switched voltage to vary the amount of the current conducted through the path; and
   disconnecting the switched voltage includes: before disabling the path, disconnecting the switched voltage from varying the amount.

6. The method of claim 1, wherein generating the output voltage includes: charging an inductor for increasing the output voltage in response to the control signals; and discharging the inductor in response to the control signals.

7. The method of claim 6, wherein a speed of increasing the output voltage is faster than a speed of reducing the output voltage.

8. The method of claim 1, wherein the mode signals are identical to the control signals.

9. A system, comprising:
   a comparator for comparing an output voltage to a reference voltage and outputting comparison signals in response to the comparing;
   a controller coupled to the comparator for outputting control signals and mode signals in response to the comparison signals; and
   circuitry coupled to the controller and to the comparator for receiving the control signals and generating the output voltage in response thereto;
   wherein the comparator is for: increasing a speed of the comparing in response to the mode signals indicating that the circuitry is increasing the output voltage; and reducing the speed in response to the mode signals indicating that the circuitry is reducing the output voltage;
   wherein the comparator includes a first switch for: increasing the speed by enabling a path to conduct current; and reducing the speed by disabling the path against conducting current; and
   wherein the comparator includes a second switch for: while the path is enabled by the first switch, connecting at least one switched voltage to vary an amount of the current conducted through the path, wherein the switched voltage is at least one of the reference voltage and the output voltage; and, while the path is disabled by the first switch, disconnecting the switched voltage from varying the amount.

10. The system of claim 9, wherein the controller is for outputting the control signals for causing the circuitry to generate the output voltage approximately equal to the reference voltage.

11. The system of claim 9, wherein the switch is a first switch, and wherein the comparator includes: a resistor; and a second switch for bypassing the resistor while the path is enabled by the first switch.

12. The system of claim 9, wherein a transitioning of the first switch is non-overlapping with a transitioning of the second switch.

13. The system of claim 12, wherein the second switch is for: after the first switch enables the path, connecting the switched voltage to vary the amount of the current conducted through the path; and, before the first switch disables the path, disconnecting the switched voltage from varying the amount.

14. The system of claim 9, wherein the circuitry is for: charging an inductor for increasing the output voltage in response to the control signals; and discharging the inductor in response to the control signals.

15. The system of claim 14, wherein a speed of increasing the output voltage is faster than a speed of reducing the output voltage.

16. The system of claim 9, wherein the mode signals are identical to the control signals.

17. A system, comprising:
   a comparator for comparing an output voltage to a reference voltage and outputting comparison signals in response to the comparing;
   a controller coupled to the comparator for outputting control signals and mode signals in response to the comparison signals; and
   circuitry coupled to the controller and to the comparator for receiving the control signals and generating the output voltage in response thereto;
   wherein the controller is for outputting the control signals for causing the circuitry to generate the output voltage approximately equal to the reference voltage;
   wherein the comparator is for: increasing a speed of the comparing in response to the mode signals indicating that the circuitry is increasing the output voltage; and reducing the speed in response to the mode signals indicating that the circuitry is reducing the output voltage;

wherein the circuitry is for: charging an inductor for increasing the output voltage in response to the control signals; and discharging the inductor in response to the control signals, wherein a speed of increasing the output voltage is faster than a speed of reducing the output voltage;

wherein the comparator includes a first switch for: increasing the speed by enabling a path to conduct current; and reducing the speed by disabling the path against conducting current; and wherein the comparator includes a second switch for: while the path is enabled by the first switch, connecting at least one switched voltage to vary an amount of the current conducted through the path, wherein the switched voltage is at least one of the reference voltage and the output voltage; and, while the path is disabled by the first switch, disconnecting the switched voltage from varying the amount.

18. The system of claim 17, wherein the switch is a first switch, and wherein the comparator includes: a resistor; and a second switch for bypassing the resistor while the path is enabled by the first switch.

19. The system of claim 17, wherein a transitioning of the first switch is non-overlapping with a transitioning of the second switch.

20. The system of claim 19, wherein the second switch is for: after the first switch enables the path, connecting the switched voltage to vary the amount of the current conducted through the path; and, before the first switch disables the path, disconnecting the switched voltage from varying the amount.

21. The system of claim 20, wherein the mode signals are identical to the control signals.

\* \* \* \* \*